United States Patent [19]
Schmitz

[11] 3,712,309
[45] Jan. 23, 1973

[54] STRAW CHOPPER MOUNTING FOR COMBINE
[75] Inventor: Raymond B. Schmitz, Independence, Mo.
[73] Assignee: Allis-Chalmers Corporation, Milwaukee, Wis.
[22] Filed: March 29, 1972
[21] Appl. No.: 239,244

[52] U.S. Cl. .................................. 130/27 R, 146/123
[51] Int. Cl. .............................................. A01f 12/40
[58] Field of Search .............. 130/27 R, 27 J, 24, 26; 146/123, DIG. 4, 117 R

[56] References Cited
UNITED STATES PATENTS 2,743,728   5/1956   Carlson.............................130/27 J
2,842,175   7/1958   Thompson..........................146/123
2,954,812   10/1960  Gronberg..........................146/123
3,256,026   6/1966   Elefson...........................146/117 R
3,587,690   6/1971   Peak..............................130/27 R Primary Examiner—Antonio F. Guida
Attorney—Kenneth C. McKivett et al.

[57] ABSTRACT

An improved mounting for a straw chopper on a combine, wherein the straw chopper can be readily moved from an operative position mounted on the rear end of the combine in underlying material receiving relation to the discharge end of the combine straw rack to an inoperative position forward from such operative position but still carried by the combine.

5 Claims, 4 Drawing Figures

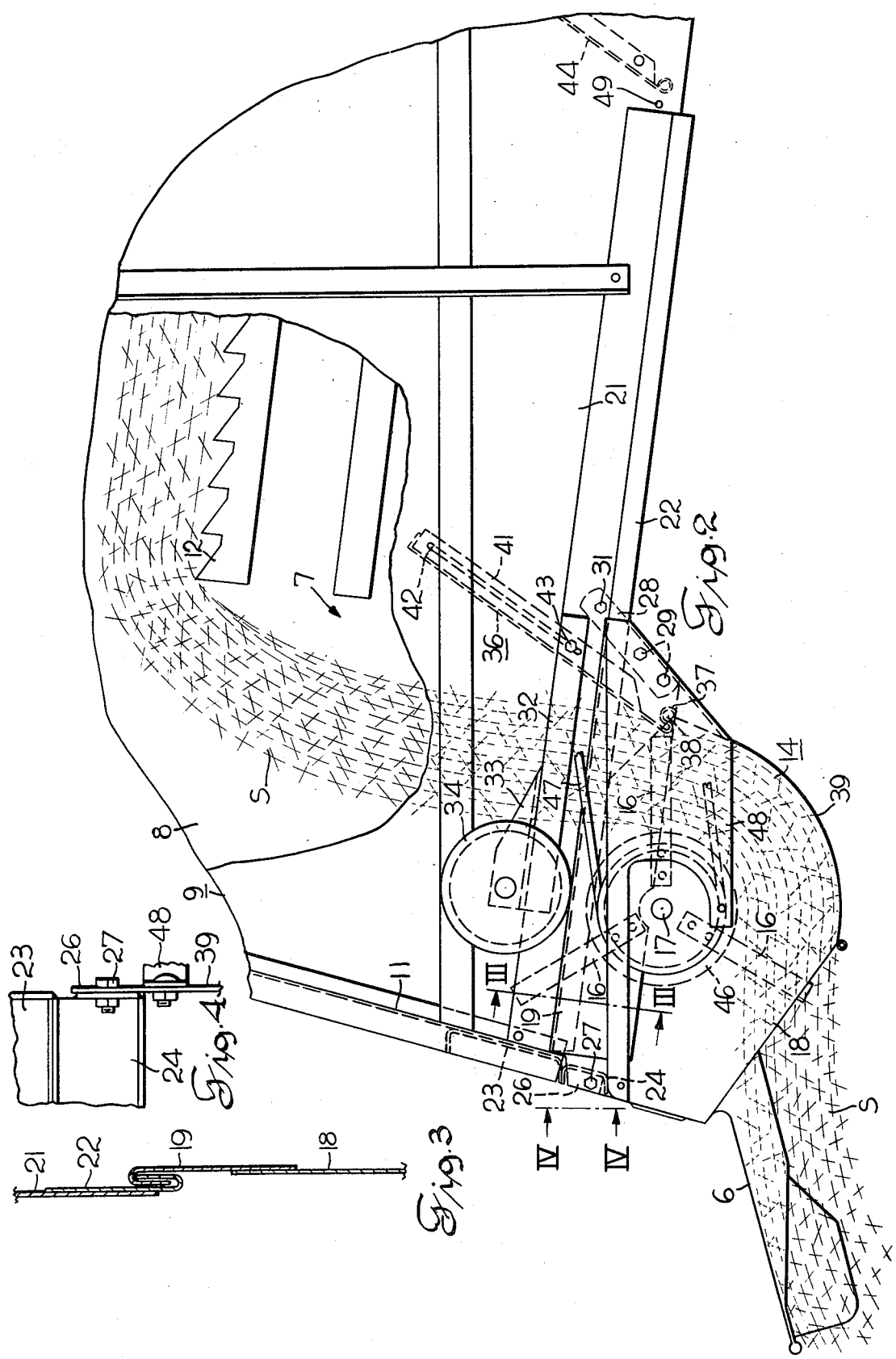

STRAW CHOPPER MOUNTING FOR COMBINE

This invention relates to an improved means for mounting a straw chopper on a combine.

When the straw or crop residue is thick, a straw chopper is used on a combine harvester to reduce the crop residue before it is spread so that such residue does not later cause tillage problems. However, in some crops or in some conditions of crops, a straw chopper is not required, nor even desired. Under such circumstances, in the past the way such situation was handled was to remove the straw chopper from the combine. This was a tedious task as straw choppers are heavy and bulky attachments which do not lend themselves to attachment or detachment from a combine by one man.

Accordingly, the present invention contemplates providing means on a combine for mounting a straw chopper in the conventional position on a combine harvester for chopping straw delivered thereto from the straw rack of such combine and wherein such straw chopper can be readily moved by one man forward to a position underlying the straw rack where such straw chopper will not interfere with the discharge of straw from such straw rack.

A further object of this invention is to provide mounting means for a straw chopper so that such chopper can remain mounted on a combine harvester at all times, but such straw chopper while so mounted can be shifted by one man from an operative straw chopping position to a neutral out of the way position.

Referring to the drawings:

FIG. 2 is a view similar to FIG. 1 with the straw chopper shown in operating position on the combine;

FIG. 3 is a section view taken on line III—III of FIG. 2; and,

FIG. 4 is a section view taken on line IV—IV of FIG. 2.

Figure 1:
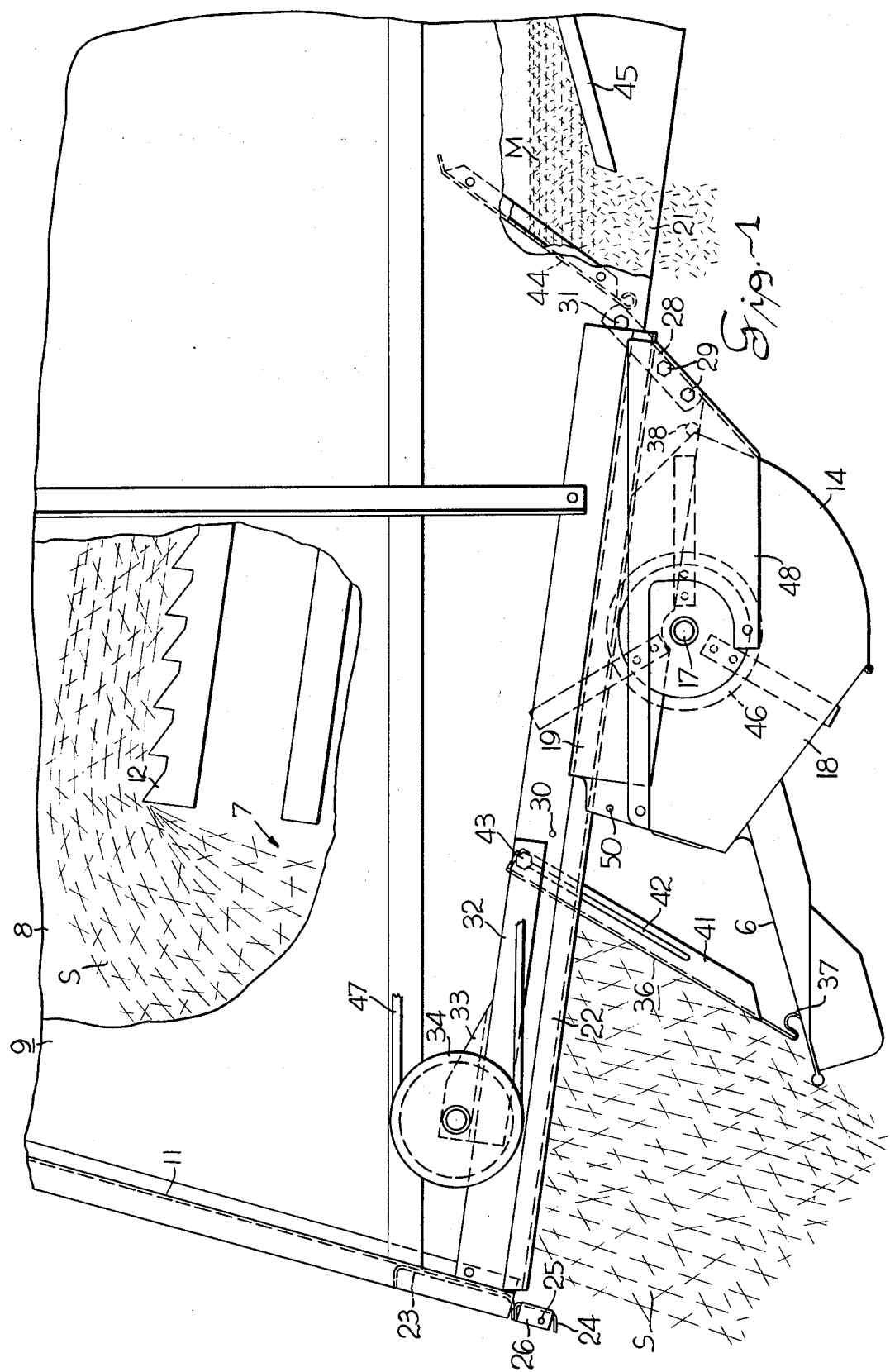
FIG. 1 is a right side elevation view of the rearward portion of a combine with a straw chopper mounted thereon in neutral position and with some parts broken away for clarity of illustration.

A preferred embodiment of the invention is shown in FIGS. 1 and 2 which includes a straw spreader 6 mounted transversely of a discharge opening 7 of a hood 8 of a combine harvester indicated generally as 9. The hood 8 has a downwardly sloping overhead and rear portion 11 which in cooperation with a straw rack 12 of the combine 9 direct the straws downwardly and rearwardly onto a straw chopper 14 upon which straw spreader 6 is mounted. This rotary straw chopper 14 is mounted for rotation on the outside of hood 8 as is shown in FIG. 2 and is driven by rotary power means (not shown) normally associated with the combine 9. Chopping blades 16 are positioned generally below the discharge opening 7 of the combine 9 and rotate in a clockwise direction to chop and spread the straw discharged through the opening 7, as viewed in FIG. 1 so that the chopped straw is thrown against the lower side of spreader 6. Straw chopper 14 includes an elongated shaft 17 mounted transversely of the combine 9 in suitable bearings (not shown) carried by transversely spaced sides 18. Each side 18 has attached along the upper portion thereof and extending inwardly, a channel member 19. Each sidewall 21 of combine 9 is provided along its rearward lower end with a channel member 22 which faces outwardly nesting with the inwardly extending portion of channel 19 in supporting relation thereto. In other words, straw chopper 14 is supported by channel members 19 and channel members 19 are supported from combine 9 by means of channel members 22. Chopper 14 can be manually slid along channel members 22 from a rear operative position in straw receiving relation to the rear ends of straw rack 12, as is shown in FIG. 2, to an inoperative forward transport position, as shown in FIG. 1.

A reinforcing member 23 is attached to the lower rear end of rear panel 11. Reinforcement 23 is provided with a U-shaped depending portion 24 extending transversely across the lower rear end of hood 8. A turned over portion 26 of U-shaped portion 24 is provided with an opening 25 which receives a bolt 27 which fastens chopper side 18 to portion 26 as is shown in FIG. 2. Strap members 28 (only one of which is shown) are attached to chopper sides 18 by means of bolts 29. The upper ends of straps 28 are bolted to channel members 22 through openings 30 therein (see FIG. 1) by means of bolts 31. A bracket 32 is attached to channel member 22 by conventional means on the right side of the combine. The bracket 32 shown in FIGS. 1 and 2 has a laterally offset portion 33 upon which an idler pulley 34 is rotatably mounted. A chute 36 is positioned between walls 21 for directing straw discharged from rack 12 onto straw chopper 14 as is shown in FIG. 2. The lower end 37 of chute 36 is configured to be complementarily received about a portion 38 of a generally circular end portion of bottom member 39 of straw chopper 14. The midside portions of chute 36 are attached to angle members 41 which are slotted at 42 to receive fastening bolts 43. A bumper member 44 extends between and is attached to sidewalls 21 in longitudinal alignment with the upper portion of strap 28 so that when chopper 14 is moved forwardly on channels 21 bumper 44 functions as a limit to such forward movement. Bumper member 44 also functions as a deflector for material M coming off of cleaning shoe 45 (see FIG. 1).

A sheave 46 is attached to shaft 17 of the chopper and sheave 46 is driven by belt 47 when the straw chopper 14 is being used as is shown in FIG. 2. Belt 47 is driven by conventional means (not shown) from the combine. A shield 48 is carried on side 18 in spaced relation to sheave 46.

Assume that straw chopper 14 is in its operative (FIG. 2) or rearward position and it is desired to place the chopper in a neutral or inoperative position, the steps to be followed are:

1. Drive belt 47 is inactive.

2. Bolts 27 and 31 are removed from each side of the combine 9.

3. Bolts 43 are loosened so that the chute 36 can be moved upwardly or downwardly with the slot 42 providing a guided movement between chute 36 and bolts 43. Chute 36 is moved upwardly wherein the lower end 37 looses contact with end portion 38.

4. Straw chopper 14 is now pushed forwardly providing slack in belt 47.

5. Belt 47 is removed from sheave 46 and from underneath shield 48 and placed about idler sheave 34 for holding such belt while straw chopper 14 is not in operating position.

6. Straw chopper 14 is then moved forwardly until bumper 44 is contacted by straps 28.

7. Bolts 31 are then inserted into openings 49 in sidewalls 21.

8. Chute 36 is then lowered to the position shown in FIG. 1 and bolts 43 are tightened retaining the chute in such position.

It is thus apparent that mechanism has been provided wherein one man can shift a straw chopper from an inoperative position to an operative position or vice versa, with ease and without the use of special tools.

One big advantage should be pointed out. When the straw chopper 14 is pushed forward until it contacts bumper 44, the bumper 44 not only prevents further forward movement of the chopper but functions to align the openings in straps 28 with openings 49 so that the bolts 31 can be easily inserted and directs material M passing over shoe 45 downwardly to the ground. When the straw chopper is moved in the opposite direction member 23 functions as a bumper for preventing further rearward movement of chopper 14 and also aligning openings 50 up with opening 25 for the insertion of bolts 27 and aligning the upper opening in straps 28 with openings 30 in channels 22 for the insertion of bolts 31.

If desired, antifriction devices may be used in connection with channel members 19 and 22. What has been shown is the preferred embodiment which is operative and inexpensive.

It is to be noted that in FIG. 1, chute 36 is positioned to direct straw from rack 12 in a windrow onto the ground without such straw contacting chopper 14. In FIG. 2, chute 36 directs straw from rack 12 directly into chopper 14 wherein the straw is disintegrated by blades 16 which impel the straw residue against the lower side of spreader device 6.

The embodiment of the invention in which an exclusive property or privilege is claimed are defined as follows:

1. In a combine having a longitudinally extending straw rack, a hood positioned over the discharge end of said straw rack, said hood being provided with longitudinally extending opposed side walls joined by an overhead and rear end portion, the improvement comprising a longitudinally extending first channel member attached to each of said side walls, a straw chopper having longitudinally extending sides, a knife bearing transversely extending rotor rotatably mounted in said sides, a longitudinally extending second channel member attached to each side and being complementary to said first channel members so that said straw chopper is supported from said hood by means of a nesting coaction between said first and second channel members, said straw chopper being slidably mounted for longitudinal movement along said first channel members, means for retaining said straw chopper in a first position in receiving relation to straw discharged from said straw rack and for retaining said straw chopper in a forward neutral position relative to said discharge end of said straw rack.

2. In the combination recited in claim 1 and wherein combine operated belt means are provided for driving said straw chopper when in said first position, and idler means carried by said hood are provided for supporting said belt means when said straw chopper is in said forward position.

3. In the combination recited in claim 2 including chute means carried by said hood and being positionable to direct straw from said rack into said straw chopper when in said first position and positionable to direct straw discharged from said rack and shoe onto the ground away from said straw chopper when in said forward position.

4. In the combination recited in claim 3 including means carried by said combine for limiting the longitudinal movement of said straw chopper in either a fore or aft direction.

5. A method of positioning a straw chopper in an inoperative position on a combine from an operative straw chopping position comprising the following steps:
   1. Inactivating the drive of the straw chopper;
   2. Remove fastening means from said chopper;
   3. Slide chopper forwardly; and
   4. Replace fastening means retaining said chopper in said forward position.

* * * * *

Disclaimer 3,712,309.—*Raymond B. Schmitz*, Independence, Mo. STRAW CHOPPER MOUNTING FOR COMBINE. Patent dated Jan. 23, 1973. Disclaimer filed May 7, 1975, by the assignee, *Allis-Chalmers Corporation*.

Hereby enters this disclaimer to all claims of said patent.

[*Official Gazette July 22, 1975.*]